United States Patent
Hauswald et al.

(10) Patent No.: US 10,795,016 B2
(45) Date of Patent: Oct. 6, 2020

(54) METHOD AND ADS-B BASE STATION FOR VALIDATING POSITION INFORMATION CONTAINED IN A MODE S EXTENDED SQUITTER MESSAGE (ADS-B) FROM AN AIRCRAFT

(71) Applicant: THALES MANAGEMENT & SERVICES DEUTSCHLAND GMBH, Ditzingen (DE)

(72) Inventors: Scott Hauswald, Korntal-Muenchingen (DE); Holger Neufeldt, Vaihingen/Enz (DE)

(73) Assignee: THALES MANAGEMENT & SERVICES DEUTSCHLAND GMBH, Ditzingen (DE)

( * ) Notice: Subject to any disclaimer, the term of this patent is extended or adjusted under 35 U.S.C. 154(b) by 319 days.

(21) Appl. No.: 15/840,465

(22) Filed: Dec. 13, 2017

(65) Prior Publication Data
US 2018/0172797 A1    Jun. 21, 2018

(30) Foreign Application Priority Data
Dec. 16, 2016    (EP) .................................... 16204658

(51) Int. Cl.
*G01S 3/02* (2006.01)
*G01S 13/91* (2006.01)
(Continued)

(52) U.S. Cl.
CPC ............ *G01S 13/91* (2013.01); *G01S 13/781* (2013.01); *G01S 13/933* (2020.01);
(Continued)

(58) Field of Classification Search
CPC ...... G01S 5/021; G01S 5/0027; G01S 5/0205; G01S 5/0221; G01S 13/781; G01S 13/87;
(Continued)

(56) References Cited

U.S. PATENT DOCUMENTS

| 6,542,810 B2 * | 4/2003 | Lai | G01S 13/66 340/500 |
| 6,810,322 B2 * | 10/2004 | Lai | G01S 13/66 701/120 |

(Continued)

FOREIGN PATENT DOCUMENTS

| EP | 2296128 A1 * | 3/2011 | ............... G08G 5/00 |
| EP | 3088911 A1 | 11/2016 | |

OTHER PUBLICATIONS

Yoohwan Kim, Ju-Yeon Jo, Sungchul Lee, University of Nevada, Las Vegas, NV; A Secure Location Verification Method of ADS-B, 2016 IEEE/AIAA 35th Digital Avionics Systems Conference (DASC), IEEE, Sep. 25, 2016, pp. 1-10, XP033019268, DOI: 10.1109/DASC.2016.7778003

(Continued)

*Primary Examiner* — Chuong P Nguyen
(74) *Attorney, Agent, or Firm* — Bond Schoeneck & King, PLLC; George McGuire

(57) ABSTRACT

The invention refers to a method and a base station for validating information regarding the position of a target-aircraft, the information contained in an ADS-B signal periodically broadcast by the target-aircraft, with the method being executed in the ADS-B base station.

16 Claims, 5 Drawing Sheets

(51) Int. Cl.
*G08G 5/00* (2006.01)
*G01S 13/78* (2006.01)
*G01S 13/933* (2020.01)
*G01S 13/87* (2006.01)
*G01S 5/02* (2010.01)
*G01S 5/00* (2006.01)
*G01S 19/03* (2010.01)
*G08G 5/04* (2006.01)
*H04B 7/185* (2006.01)
*H04W 88/08* (2009.01)

(52) U.S. Cl.
CPC ......... *G08G 5/0004* (2013.01); *G08G 5/0008* (2013.01); *G08G 5/0013* (2013.01); *G08G 5/0078* (2013.01); *G08G 5/0082* (2013.01); *G01S 5/0027* (2013.01); *G01S 5/0072* (2013.01); *G01S 5/021* (2013.01); *G01S 5/0205* (2013.01); *G01S 5/0221* (2013.01); *G01S 13/87* (2013.01); *G01S 19/03* (2013.01); *G08G 5/0026* (2013.01); *G08G 5/04* (2013.01); *H04B 7/18506* (2013.01); *H04W 88/08* (2013.01)

(58) Field of Classification Search
CPC ...... G01S 13/9303; G01S 13/91; G01S 19/03; G01S 19/14; G08G 5/0004; G08G 5/0008; G08G 5/0013; G08G 5/0026; G08G 5/0078; G08G 5/0082; G08G 5/04
USPC ..... 342/357.4, 357.52, 456; 701/3, 120, 484
See application file for complete search history.

(56) References Cited

U.S. PATENT DOCUMENTS

| | | | | |
|---|---|---|---|---|
| 7,123,192 B2* | 10/2006 | Smith | ........................ | G01S 5/06 342/455 |
| 7,132,982 B2* | 11/2006 | Smith | ................... | G01S 13/723 342/456 |
| 7,612,716 B2* | 11/2009 | Smith | ................... | G01S 13/765 342/454 |
| 8,063,744 B2* | 11/2011 | Wu | ........................ | G01S 5/0081 340/10.1 |
| 8,498,803 B2* | 7/2013 | Blomenhofer | ....... | G08G 5/0052 701/120 |
| 8,736,482 B2* | 5/2014 | Wu | ........................... | G01S 5/10 342/30 |
| 8,791,861 B2* | 7/2014 | Garcia | ...................... | G01S 5/10 342/387 |
| 9,218,741 B2* | 12/2015 | Wu | ........................ | G01S 13/767 |
| 2011/0140950 A1 | 6/2011 | Andersson | | |
| 2018/0196140 A1* | 7/2018 | Garcia | ...................... | G01S 5/12 |
| 2020/0088887 A1* | 3/2020 | Garcia | ...................... | G01S 5/06 |

OTHER PUBLICATIONS

European Search Report Form , European Application No. EP 16 204 658.5-1812, pp. 1-6; European Filing Date Dec. 16, 2016, search report dated May 22, 2017.

* cited by examiner

METHOD AND ADS-B BASE STATION FOR VALIDATING POSITION INFORMATION CONTAINED IN A MODE S EXTENDED SQUITTER MESSAGE (ADS-B) FROM AN AIRCRAFT

CROSS-REFERENCE TO RELATED APPLICATION

The present application relates and claims priority to European Application No. EP 16 204 658.5-1812, filed Dec. 16, 2016, the entirety of which is hereby incorporated by reference.

BACKGROUND OF THE INVENTION

The present invention refers to a method for validating position information contained in a Mode S Extended Squitter Message commonly known as ADS-B, which is periodically broadcast by a target aircraft. Furthermore, the invention refers to an ADS-B base station adapted for receiving a Mode S Extended Squitter Message commonly known as ADS-B, which is periodically broadcast by a target aircraft and which contains position information regarding the position of the target aircraft, and which ADS-B base station is further adapted for validating the received position information.

Automatic dependent surveillance-broadcast (ADS-B) is a surveillance technology in which an aircraft determines its position via internal navigation sources and periodically broadcasts it, enabling the aircraft to be tracked. The position information can be determined by many means, such as global navigation satellite system (GNSS), for example NAVSTAR GPS (USA), GLONASS (Russia), COMPASS (China) or GALILEO (Europe). Of course, any GNSS yet to come could also be used to determine the position information of the aircraft. Furthermore, inertial navigation sensors could be used to determine the aircraft's position information, too. The position information is transmitted in the ADS-B signals periodically broadcast by the aircraft. The information can be received by ADS-B base stations operated by air navigation service providers (ANSP), for example the 'Deutsche Flugsicherung (DFS)' in Germany, as a replacement for secondary surveillance radar (SSR). It can also be received by other aircraft (ADS-B IN) to provide situational awareness and allow self-separation.

ADS-B is "automatic" in that it requires no pilot or operator input to provide for the content of the ADS-B signals or to trigger the broadcast of the ADS-B signals. It is "dependent" in that it depends on data from the aircraft's navigation system. In particular, position and velocity vector can be derived from a GNSS (Global Navigation Satellite System), or from an inertial navigation sensor, or an FMS (Flight Management System). "Surveillance" refers to a method of determining the position of an aircraft. The "broadcast" in ADS-B means that the transmitted signal can be received and is available to anyone with the appropriate receiving equipment. A generic ADS-B Out on-board architecture comprises the following main components:
  GNSS receiver: position and velocity information,
  Air Data Computer: barometric altitude,
  ADS-B capable Mode S transponder with associated control panel (crew to enter Flight ID/Mode A),
  Antennae (GNSS, Mode S).
  These components are also used for other functions:
  GNSS is generally part of MMR (en-route/approach navigation, landing),
  Mode S transponder is used for Mode S radar (surveillance and communication) and for TCAS.

ADS-B is an element of the US Next Generation Air Transportation System (NextGen), Airports Authority of India upgrade plans in line with ICAO (International Civil Aviation Organization) Global Plan Initiatives and Aviation System Block Upgrade (ASBU) and the Single European Sky ATM Research (SESAR). ADS-B equipment is currently mandatory in portions of Australian airspace, the United States requires some aircraft to be equipped by 2020 and the equipment will be mandatory for some aircraft in Europe from 2017. Canada is already using ADS-B for air traffic control.

Previously and still commonly used Secondary Surveillance Radars (SSR) determine the aircraft's position simply by determining and evaluating the transmission and reception time schemes of the transmitted signals, i.e. the SSR interrogates targets and then waits for the response and upon receipt of the response calculates a range and bearing for the target. No content of the signals, or at least no aircraft position information transmitted from the aircraft to the SSR, is used for determining the aircraft's position. Because the SSR equipment is owned and operated by the ANSP, it can fully trust the position determinations done by the SSR.

This is different with ADS-B that the position in the ADS-B signal is determined by the target aircraft as described above. Because there are many aircraft operators, many different types of aircraft and many different types of Mode S transponders capable of ADS-B, technical issues can arise that make the position information in the ADS-B signal unreliable. As an example, the inputs used internally in the aircraft to calculate its position or to communicate the position to onboard electronics can have technical problems, the aircraft's position determined by means of the GNSS can have a deliberate or stochastic error. Furthermore, the ADS-B transponder on-board the aircraft has to be correctly mounted in the aircraft and integrated into the existing infrastructure. An incorrect mounting or erroneous integration of the transponder can lead to a plurality of possible errors. Further, it is even possible that many operation parameters of the ADS-B transponder on-board the aircraft can be manually manipulated, for example by a crew member of the aircraft, which may also result in an error. Hence, there are many reasons why an error or an inaccuracy could be caused in the position data transmitted within the ADS-B signal, which are outside the realm of influence or knowledge to the ADS-B base stations. Even certified on-board ADS-B system components sometimes can provide anomalies. Conventional ADS-B base stations have no information whatsoever regarding the correctness of the position information received via the ADS-B signals. The base stations are fully dependent on a proper functioning of the ADS-B system components on-board each aircraft.

SUMMARY OF THE INVENTION

Having in mind the drawbacks of the known ADS-B systems, there is a need to enable ADS-B base stations to validate the correctness of the position information received within the ADS-B signals from a target-aircraft. This would significantly enhance the trustworthiness of the position data contained in the ADS-B message for each aircraft, thereby significantly enhancing the safety in the air space. Furthermore, false alarms due to inaccurate position information of one or more aircraft in the air space could be reduced to a minimum. On the other hand, the aircraft currently flying through the air space observed by the ADS-B base station could be guided much closer to one another, thereby significantly enhancing the aircraft capacity in a given volume of air space (by reducing separation minimums). It is a further object to achieve all this without adding further load in the radio spectrum, for example by additional interrogations.

In order to achieve these objects the present invention suggests a method for validating information regarding the position of a target-aircraft, the information contained in an ADS-B signal, which is periodically broadcast by the target-aircraft, the method being executed in an ADS-B base station. The method according to the invention comprises the steps of:

receiving the ADS-B signal from the target-aircraft at the base station, extracting the position information contained in the received ADS-B signal, detecting, receiving and decoding an interrogation signal from a secondary surveillance source directed to the target-aircraft and detecting and receiving a reply signal transmitted by the target-aircraft in response to the interrogation signal, determining a time of arrival (TOA) of the received interrogation signal and of the received reply signal at the base station, based on the time of arrival of the interrogation signal and on the position information received from the aircraft, determining at least one expectation time window, in which the reply signal from the target-aircraft is expected to be received by the base station, determining whether the reply signal from the target-aircraft is received during one of the at least one expectation time window, if the reply signal from the target-aircraft is received by the base station during one of the at least one expectation time window, enhancing the confidence level of the position information contained in the ADS-B signal.

The general idea of the present invention is to monitor any kind of interrogation and reply signals from any type of secondary surveillance source for validating the position information contained in an ADS-B signal. The ADS-B signal is preferably a 1,090 MHz Extended Squitter (1090 ES) periodically transmitted, preferably in a downlink format DF17, by an appropriate transponder on-board the aircraft. The ADS-B 1090 ES signal is periodically transmitted by the transponder not in response to an interrogation signal but rather on its own initiative. The received interrogation and reply signals from the secondary surveillance source are used for determining the integrity of the received ADS-B signal, in particular for evaluating the correctness of the received position information contained in the ADS-B signal and/or to assign a certain confidence level to the received position information.

Preferably, an expectation confidence window is determined for each of the secondary surveillance sources of interest, which may have possibly transmitted the interrogation signal. The confidence level may consist of only two states (e.g. '1': 'the position information can be trusted' or '0': 'the position information cannot be trusted'). However, it is also possible that there are several confidence levels (e.g. '0' (binary '00'): 'no confidence' to '3' (binary '11'): 'high level of confidence') and that the confidence level of position information from a certain aircraft is increased (upgraded) each time a monitored reply signal from the aircraft is received by the base station within one of the previously determined expectation time windows. When the maximum confidence level (e.g. '3' (binary '11')) is reached, no further increase of the confidence level is performed. On the other hand it is possible, if a monitored reply signal from the aircraft is not received by the base station within one of the previously determined expectation time windows, that the confidence level is decreased (downgraded).

The present invention allows an ADS-B base station to make a statement and keep track of the quality, in particular correctness, of position information contained in an ADS-B signal periodically broadcast by an aircraft's ADS-B transponder and received by the ADS-B base station. By means of the present invention the radio spectrum is relieved because no additional interrogations are required for achieving the verification and validation of the position information contained in the ADS-B signal.

The base station receiving the ADS-B signal and monitoring the interrogation and reply signals from a secondary surveillance source, for example any kind of SSR system, involving the target-aircraft is preferably a ground based station but it could also be located on a satellite. In order to be able to determine the at least one expectation time window, in which a response from the target-aircraft is expected to be received by the base station, the exact position of the base station receiving the ADS-B signal from the target-aircraft and the interrogation and reply signals from the secondary surveillance sources must be known. This is usually no problem with a ground based station and with a base station located on-board a satellite in a geosynchronous orbit (GSO) or a geostationary orbit (GEO). If the base station is located on a Low Earth Orbit (LEO) satellite orbiting in an altitude from approximately 160 to 2,000 km or on a Medium Earth Orbit (MEO) satellite orbiting in an altitude ranging from approximately 2,000 km to just below geosynchronous orbit at 35,786 km (most commonly 20,200 km or 20,650 km with an orbital period of 12 hours) the satellite's position will change over time in respect to the earth's surface. But nonetheless the satellite's position at any given point in time, in particular when receiving the ADS-B signal with the position information, the interrogation and the reply signal from the secondary surveillance source, can still be determined with a sufficiently high accuracy in order to perform the verification and validation of the position information of the aircraft contained in the received ADS-B signal. Respective methods for determining the satellite's position in space with a sufficiently high accuracy are well-known in the art.

The interrogation signals received by the base station may have been transmitted by any kind of secondary surveillance source. This may be another base station (also located on the ground or on-board a satellite) or another interrogator aircraft. These sources transmit interrogation signals towards the target-aircraft as soon as the target-aircraft enters their region of interest, within a variable interference level. In ACAS, the interference level may be, for example, 10,000 feet (3,048 m) or 10 nautical miles (18.52 km). Of course, the interference levels of the region of interest of the secondary surveillance sources can be variably selected depending on a plurality of environmental and air-traffic parameters (e.g. weather and how crowded the airspace is). Of course, it would also be possible to monitor interrogation signals transmitted by the same base station which also receives the ADS-B signals with the position information from the target-aircraft. In that case the base station would be a combined ADS-B and SSR base station.

In order to determine the at least one expectation time window, one or more of the following variables and parameters may be used:

the exact position (in respect to the earth's surface) of the base station receiving the ADS-B signal from the aircraft and the interrogation signal from the secondary surveillance source, an address and the unverified position (in respect to the earth's surface) of the target-aircraft, to which the interrogation signal received by the base station is addressed, the position (in respect to the earth's surface) of the interrogator of the secondary surveillance source transmitting the interrogation signal received by the base station, either based on a known position or the position transmitted by the interrogator (e.g. ADS-B Target with ACAS/TCAS), and the time of arrival (TOA) of the interrogation signal at the base station.

The position of the interrogator of the secondary surveillance source can be an assumed ADS-B position (ACAS/TCAS interrogator) received by the base station but not (yet) verified. In that case the interrogator is the transponder of another interrogator-aircraft. The position of the interrogator of the secondary surveillance source can also be a known position. This could be a verified ADS-B position (ACAS/TCAS interrogator) of another interrogator-aircraft. It could also be a known position of an independent ground based interrogator (third party MLAT/WAM interrogator).

In order to validate the target-aircraft position information contained in the ADS-B signal, furthermore the time of arrival (TOA) of the reply signal at the base station is required, in order to be able to determine whether it is received within one of the at least one previously defined expectation time windows. The address of the target-aircraft to which the interrogation signal is directed is contained in the interrogation signal and can be extracted by decoding the signal. The overall content of the reply signal is of no interest for the present invention. Decoding of the reply signal is only necessary for determining the Mode S address.

From the determined TOA of the interrogation signal at the base station it is possible to work back to an assumed time of interrogation (TOI) which is the time of transmission (TOT) of the interrogation signal for the respective one or more interrogators of secondary surveillance sources (base station or another aircraft). The one or more sources, for which the assumed TOI is determined, are those sources which may possibly have transmitted the interrogation signal, received by the base station. If the received interrogation signal is addressed to the target-aircraft which previously transmitted the ADS-B signal, the target-aircraft is expected to send a reply signal in response to the interrogation signal soon. In particular, based on the assumption that all position information available is correct, the reply signal from the target-aircraft, which previously broadcast the ADS-B signal, can be expected to be received at the base station at a certain point in time or within a certain expectation time window, depending on the position of the target-aircraft, the position of the interrogator of the secondary surveillance source which transmitted the interrogation signal and the TOA of the interrogation signal at the base station.

If the reply signal is indeed received within the determined expectation time window, one can go on the assumption that the position information contained in the ADS-B signal and the position information of the secondary surveillance source, which transmitted the interrogation signal, are correct. As time progresses and the method for validation according to the present invention has been performed continuously for the same aircraft, the position information contained in the ADS-B signal received from that aircraft is assigned an increasingly higher level of confidence. In addition, as the method according to the present invention has been performed for an increasing number of different aircraft the position information contained in the ADS-B signals from an increasing number of aircraft within the region of interest of the base station is validated.

According to a preferred embodiment of the present invention, separate expectation time windows are determined for each of the interrogators of secondary surveillance sources (other base station and/or interrogator-aircraft) which could have potentially transmitted the interrogation signal received by the base station. When receiving an interrogation signal, the base station usually has no information regarding the sender of the interrogation signal. The interrogation signal contains an address of a target-aircraft to which the interrogation signal is directed (and which is requested to transmit a reply signal) but it does not contain information regarding the sender (other base station and/or interrogator-aircraft). Therefore, upon receipt of an interrogation signal the base station determines a separate expectation time window for each possible sender of the received interrogation signal. If the respective reply signal is received at the base station within one of the defined expectation time windows, the base station knows which interrogator (other base station and/or interrogator-aircraft) of the secondary surveillance source transmitted the interrogation signal and that the position information contained in the ADS-B signal and used for determining the at least one position window is correct. Hence, the base station has effected a successful validation of the position information previously received from the target-aircraft via the ADS-B signal. Consequently the level of confidence of the target-aircraft's position information contained in the ADS-B signal is increased.

There are many different secondary surveillance sources, which transmit interrogation signals in order to provoke target-aircraft to send a reply signal. For example, it is suggested that the received interrogation and reply signals are transmitted as part of a Traffic Alert and Collision Avoidance System (TCAS)/Airborne Collision Avoidance System (ACAS), a Multilateration (MLAT) system or a Wide Area Multilateration (WAM) system. Of course, according to the present invention other interrogation and reply signals from other secondary surveillance sources could be used for validation purposes, too. Interrogation signals in MLAT, WAM and other secondary surveillance sources typically use uplink formats UF4, UF5, UF11, UF20 or UF21. Reply signals in these secondary surveillance systems use the corresponding downlink formats DF4, DF5, DF11, DF20 or DF21.

According to a preferred embodiment of the present invention, the monitored interrogation signal is transmitted at 1,030 MHz and the monitored reply signal is transmitted at 1,090 MHz. This is typically the frequency range in which TCAS/ACAS signals defined in ICAO DOC 9863 are transmitted. The TCAS/ACAS interrogation signals typically use uplink formats UF0 (for tracking) and/or UF16 (for conflict resolution). The TCAS/ACAS reply signals typically use the corresponding downlink formats DF0 or DF16. The ACAS II standard provides pilots of aircraft with airspace surveillance, intruder tracking, threat detection and avoidance manoeuvre generations. It can determine whether each of the tracked aircraft is climbing, descending, or flying straight and level, and suggests an evasive manoeuvre. Preferably, evasive manoeuvres are coordinated via air-to-air transmissions so the proposed manoeuvres will not cancel each other out.

TCAS/ACAS interrogation signals are transmitted by interrogator-aircraft to a selected target-aircraft which has found to be in their region of interest. The area of interest can be, for example, 15 to 40 nautical miles (nm) forward, 5 to 15 nm aft and 10 to 20 nm each side of the aircraft. The interrogation signals are directed to a specific target-aircraft and contain its address. The interrogation signals provoke the target-aircraft, to which the signal is directed, to respond with a reply signal directed to the interrogator-aircraft which transmitted the interrogation signal. The response signal contains information regarding the height (3D-position) of the target-aircraft transmitting the response signal. Even though the interrogation and reply signals are directed to certain targets (other aircraft) they can be received by any other appropriate receiver, too. To this end, the ADS-B base station according to the present invention is equipped with an appropriate receiver for receiving the interrogation and corresponding reply signals from the secondary surveillance source(s). It is emphasized that for the sake of the present invention, not the content of the interrogation and/or reply signals is important but rather the TOA of the signals at the receiving base station.

According to one embodiment of the invention, the received interrogation signal has been transmitted by another interrogator-aircraft, wherein the at least one expectation time window, in which a response from the target-aircraft is expected to be received by the base station, is determined further based on previously acquired position information of the transmitting other interrogator-aircraft. Preferably, the expectation time window is determined based on a previously verified position of the transmitting other interrogator-aircraft, having an enhanced confidence level.

Determining the position in time and duration of the expectation time window by the base station is of great importance for the present invention and the validation of the position information. If the window is determined too short, the reply signal transmitted by the target-aircraft in response to the received interrogation signal will often be received by the base station at a point in time outside the window, making a verification of the position information difficult if not impossible. If the window is determined too long, the reply signal transmitted by the target-aircraft in response to the received interrogation signal will be received by the base station at a point in time within the window, even though the unverified position information contained in the ADS-B signal is incorrect or erroneous, resulting in a false validation of the position information. Therefore, it is suggested that the expectation time window has a minimum length corresponding to an assumed response time of a transponder in the target-aircraft, which transmits the reply signal in response to the interrogation signal. In particular, it is suggested that a position in time and a duration of the expectation time window are determined based on a jitter and a response delay of the transponder mounted on-board the target-aircraft transmitting the reply signal, which previously transmitted the ADS-B signal containing the position information to be verified.

ADS-B Mode S transponder ICAO defined delays are the following:

128 µs ($128 \cdot 10^{-6}$ s) transponder reply,
0.5 µs ($5 \cdot 10^{-7}$ s) transponder uncertainty,
0.08 µs ($8 \cdot 10^{-8}$ s) transponder reply delay jitter,
7 ns ($7 \cdot 10^{-9}$ s) time stamp accuracy, wherein the speed of travel of the signal is 299,792,458 m/s. Of course, in practice for example the time stamp accuracy could vary from the indicated value. Furthermore, the above value for the speed of travel of the signal is indicated for vacuum. The speed of travel could vary from the indicated value, for example if there is no real vacuum between the sender and the receiver. The values for the possible transponder delays and consequently the calculation of the expectation time window(s) would have to be adapted to the actual circumstances in each single case.

According to a preferred embodiment of the present invention it is suggested that the confidence levels of a plurality of aircraft within a region of interest of the base station are stored in a credibility matrix, to which the base station has access. The matrix may be stored in an appropriate storage device (e.g. a database) making part of the base station itself or making part of an external server to which the base station is connected. The content of the credibility matrix is dynamically updated as new aircraft come into the region of interest and existing aircraft leave the region of interest. Furthermore, the current confidence level for each of the aircraft is continuously updated according to the outcome of the method for validation of the position information contained in the ADS-B signal.

It is particularly advantageous, if at least one other base station also executing the method according to the present invention has access to the credibility matrix, in order to update the content of the matrix and to make use of the content of the matrix when verifying information regarding the position of another aircraft, the information contained in an ADS-B signal continuously broadcast by the other aircraft. According to this embodiment, at least two base stations have access to the credibility matrix and all continuously updating the data (in particular the levels of confidence) contained therein. By doing so, the credibility matrix may cover the entire airspace, for which a certain ANSP is responsible, and contains data (in particular the levels of confidence) regarding all ADS-B enabled aircraft within that airspace. This has the advantage that confidence levels for certain aircraft can be passed along from a first base station to a second base station if the aircraft leaves the region of interest of the first base station and enters the region of interest of the second base station (similar to a 'handover' in cellular telecommunications). The second base station, upon entry of the aircraft into the second base station's region of interest, can immediately consider the position information received via the ADS-B signal from that aircraft as trustworthy.

It is possible that the method according to the present invention is executed by the base station only for those aircraft, for which the broadcast ADS-B signals or the position information contained therein has not yet been validated by that specific base station. Even if an aircraft has just entered the region of interest of a specific base station, the base station may not execute the method for that aircraft if the credibility matrix, to which the base station has access, contains data for that aircraft according to which the position information broadcast by that aircraft in the ADS-B signal has already been verified and is considered trustworthy. Alternatively, it is possible that the method according to the present invention is executed at least once by a specific base station after an aircraft has entered or re-entered the region of interest of that specific base station, independent from the data stored in the credibility matrix. The idea is to confirm the credibility, accuracy and trustworthiness of the position information contained in the ADS-B signal by each base station separately and independently every time the aircraft enters or re-enters the base station's region of interest. Furthermore, it is possible that the method according to the present invention is executed regularly or periodically at certain points in time, independent from the data stored in the credibility matrix. The idea is to re-confirm the credibility, accuracy and trustworthiness of the position information contained in the ADS-B signal from time to time even if the aircraft remains in the region of interest of the same base station.

Under certain circumstances the data transmitted within the ADS-B signal may be corrupt so the information extracted from the ADS-B signal is wrong or an extraction of the information from the ADS-B signal is not possible. The reason for corrupted data may be, for example, a heavily used radio frequency spectrum on which the ADS-B signal is transmitted. In practice the probability of receiving non-corrupt data across the ADS-B signal and for the ADS-B base station being able to extract correct information therefrom is about 80%. The position information of a target aircraft on the one hand and the velocity information of the target aircraft on the other hand are transmitted within the ADS-B signal in different messages. In particular, the position squitter is transmitted twice per second and the velocity squitter is transmitted twice per second, too, each information transmitted in different squitters. Therefore, according to a preferred embodiment of the invention it is further suggested that information regarding the velocity of the target-aircraft is used for validating and if necessary correcting the position information extracted from the ADS-B signal or is used for estimating the position information if extraction of the position information from the ADS-B signal is not possible or has failed. The velocity information can be extracted from the ADS-B signal, in particular from the velocity squitters. If the information regarding the position of the target aircraft was previously correctly received, the current position of the target aircraft can be estimated by means of the previous position information and the velocity information, even if the current position information extracted from the ADS-B signal is wrong or extraction of the current position information is not possible. This step of validating and correcting or estimating the position information based on the velocity information may be performed prior to the step of detecting, receiving and decoding an interrogation signal from a secondary surveillance source directed to the target-aircraft and detecting and receiving a reply signal transmitted by the target-aircraft in response to the interrogation signal. Hence, according to this embodiment the entire method according to the invention would not be based on position information extracted from the ADS-B signal but rather either on position information corrected or estimated based on the velocity information.

The present invention also refers to a base station. In particular, an ADS-B base station is suggested, which is adapted for receiving an ADS-B signal periodically broadcast by a target-aircraft and containing information regarding the position of the target-aircraft. The base station comprises:
  receiving means for receiving the ADS-B signal from the target-aircraft, and
  processing means for extracting the position information contained in the received ADS-B signal.
In order to validate the position information extracted from the ADS-B signal, the base station further comprises
  monitoring means for detecting, receiving and decoding an interrogation signal from a secondary surveillance source directed to the target-aircraft and detecting and receiving a reply signal transmitted by the target-aircraft in response to the interrogation signal,
  the processing means adapted for determining a time of arrival (TOA) of the received interrogation signal and of the received reply signal at the base station,
  the processing means further adapted for determining at least one expectation time window, in which the reply signal from the target-aircraft is expected to be received by the base station, wherein the determination of the expectation time window is based on the time of arrival (TOA) of the interrogation signal and on the position information contained in the received ADS-B signal,
  the processing means further adapted for determining whether the reply signal from the target-aircraft is received during one of the at least one expectation time window,
  the processing means further adapted for enhancing the confidence level of the position information contained in the received ADS-B signal, if the reply signal from the target-aircraft is received by the base station during one of the at least one expectation time window.

The processing means of the base station are adapted to execute the method according to the present invention. The base station may be ground based or orbiting in space on-board a satellite. The satellite may be a LEO, MEO, GSO or a GEO satellite. The receiving means for receiving the ADS-B signal and the receiving means for receiving the reply signal from the target-aircraft in response to the interrogation signal from the secondary surveillance source may be the same receiving means. The base station may be in connection with at least one other base station in order to exchange credibility information regarding the confidence level of the position information contained in ADS-B signals broadcast by various aircraft. The base stations may be directly interconnected with each other by means of a cable or wirelessly or they may be indirectly connected to each other, for example via a database containing a credibility matrix with data (in particular the confidence levels) assigned to the position information contained in the ADS-B signals from a plurality of aircraft. The base stations may all have access to the database and may continuously update the data contained therein.

BRIEF DESCRIPTION OF THE DRAWINGS

Further features and advantages of the present invention are described in more detail in the following description of a preferred embodiment of the invention making reference to the enclosed drawings. The figures show.

DETAILED DESCRIPTION

Figure 1:
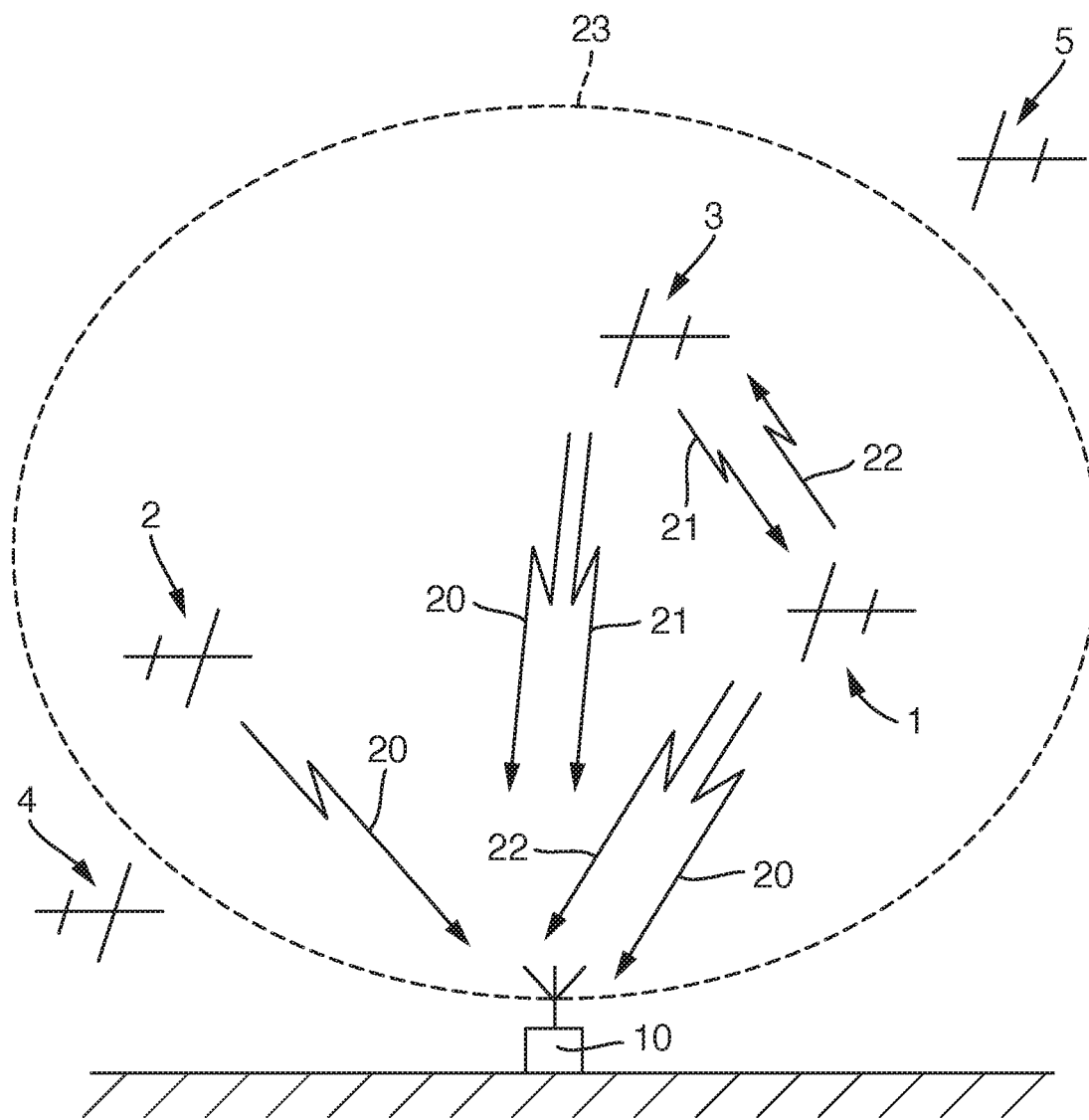
FIG. 1 a first possible scenario for realizing a preferred embodiment of the present invention, wherein the SSR interrogator is a TCAS/ACAS enabled aircraft.

In FIG. 1 a possible scenario for realizing the present invention is shown in the two dimensional plane. Of course, it is understood that the present invention will be realized in the three dimensional space. However, for the purpose of easier explanation, the invention will be described hereinafter in the two dimensional plane. The scenario comprises an ADS-B base station 10 located on the ground. Of course, base station 10 could also be located in space on-board a satellite. The satellite could be a LEO, MEO, GSO or a GEO satellite. Base station 10 is operated by an Air Navigation Service Partner (ANSP), like the German ANSP, Deutsche Flugsicherung (DFS), the Airservices Australia and the US Federal Aviation Administration (FAA), for example. Furthermore, FIG. 1 shows an example of three aircraft 1, 2, 3 within the range of interest 23 of the base station 10. An ADS-B base station 10 has a range of interest 23 of 250 nm (463 km) or more.

It is assumed that aircraft 1 is a target-aircraft and transmits an ADS-B signal 20, which among others is also received by the base station 10. The ADS-B signal 20 is preferably a 1,090 MHz Extended Squitter (ES), for example transmitted in a downlink format DF17. The ADS-B signal 20 comprises position information $X_1$, $Y_1$ relating to the aircraft 1. The position information $X_1$, $Y_1$ may be determined on board the aircraft 1 by many means, such as global navigation satellite system (GNSS), for example NAVSTAR GPS (USA), GLONASS (Russia), COMPASS (China) or GALILEO (Europe). Of course, any GNSS yet to come could also be used to determine the position information of the aircraft 1. The position information is then inserted into the ADS-B signals 20 and broadcast by means of a transponder on board the target-aircraft 1.

Figure 2:
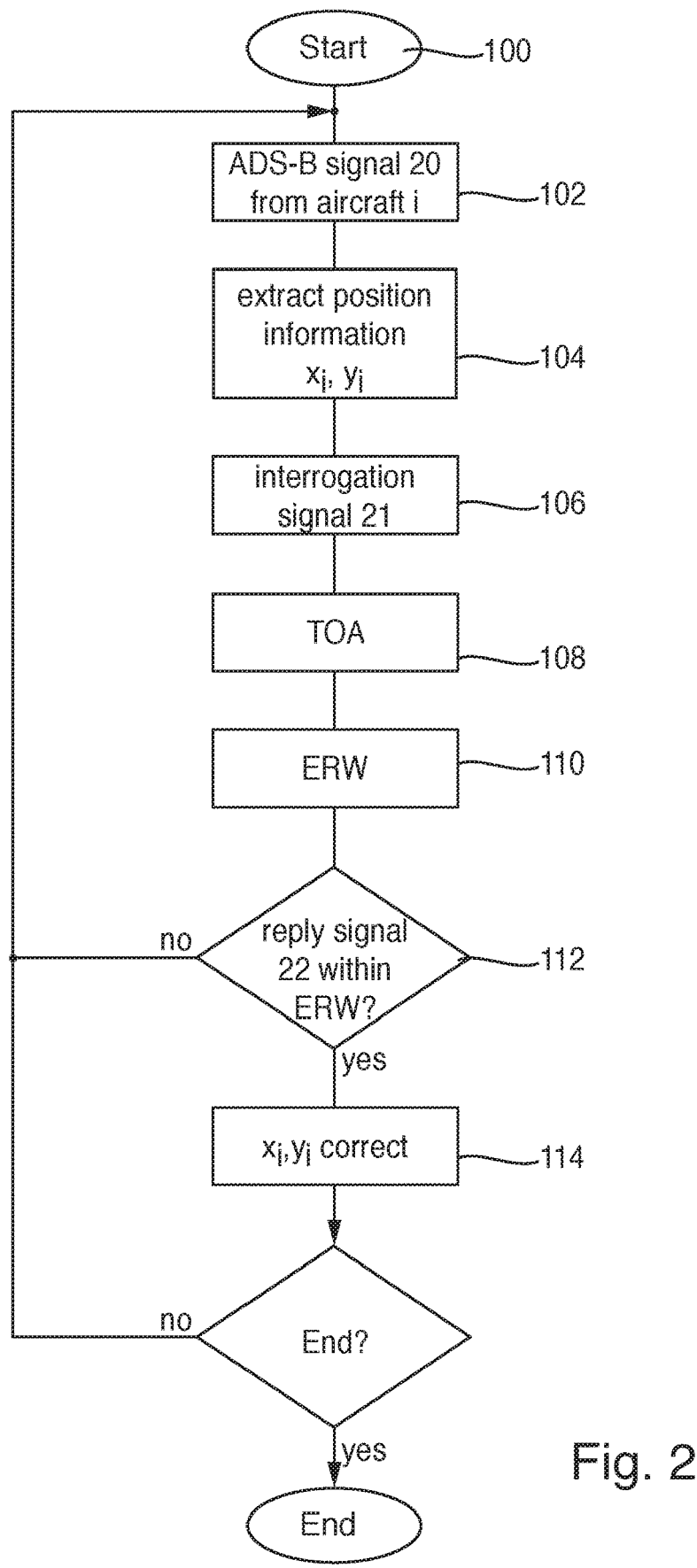
FIG. 2 a flowchart of a method according to a preferred embodiment the present invention.

The method according to the present invention shown in FIG. 2 starts at step 100. In step 102 the base station 10 receives the ADS-B signals 20 from aircraft 1 and in step 104 extracts the position information ($X_1$, $Y_1$) contained therein. The ADS-B signal 20 is preferably a 1,090 MHz Extended Squitter (1090 ES) periodically transmitted, preferably in a downlink format DF17, by an appropriate transponder on-board the aircraft 1. The base station 10 uses the position information for tracking the aircraft 1 and for realizing air traffic management (ATM) within the base station's region of interest 23. However, the base station 10 has no information whatsoever regarding the correctness and trustworthiness of position information received from aircraft 1 via the ADS-B signals 20. The present invention proposes a method and a base station 10 with an enhanced functionality allowing a verification or validation of the ADS-B position information of aircraft 1.

Figure 3:
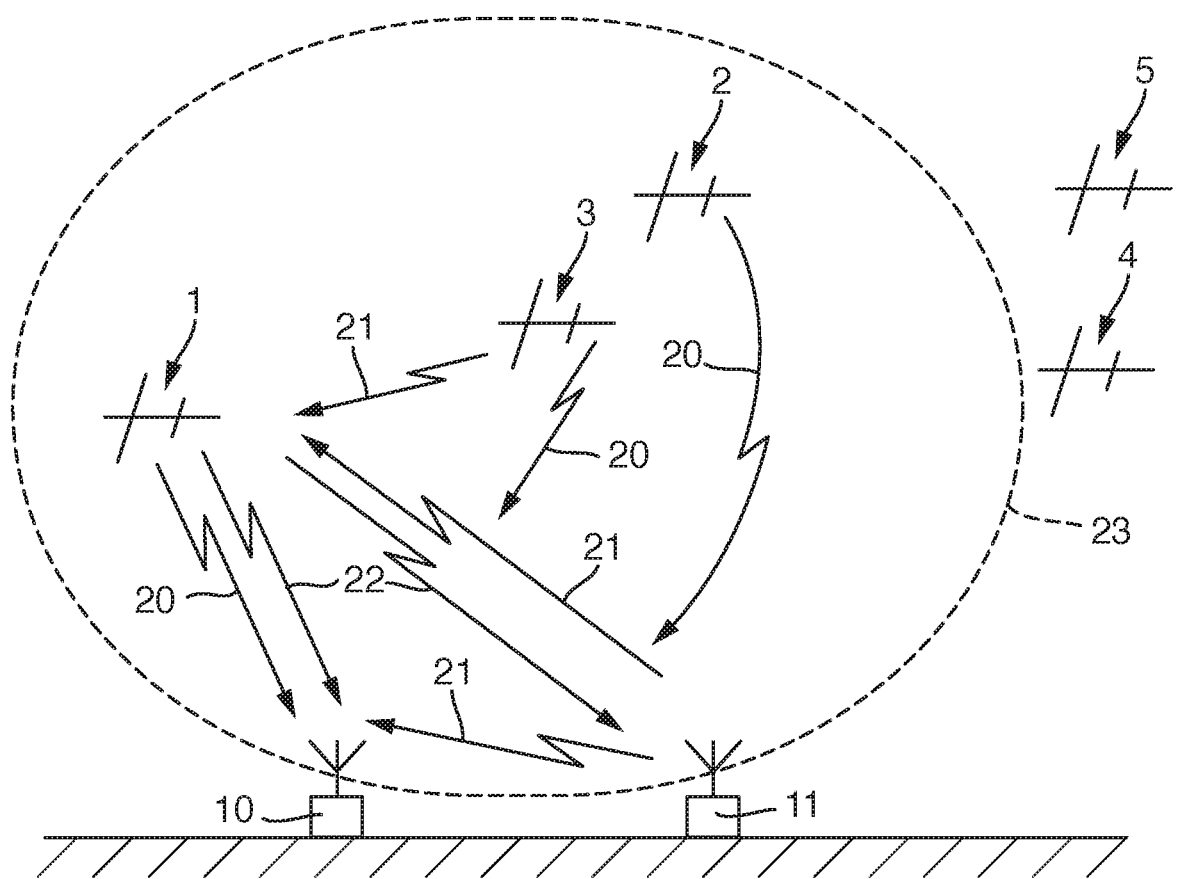
FIG. 3 a second possible scenario for realizing another preferred embodiment of the present invention, wherein the SSR interrogator is a base station different from the ADS-B base station.

The general idea of the present invention is to receive any kind of interrogation and reply signals from any type of secondary surveillance source, for example making part of an SSR system, for validating the position information ($X_1$, $Y_1$) contained in the ADS-B signals 20 received by the base station 10. The SSR system may be, for example, a Traffic Collision Avoidance System (TCAS) or an Aircraft Collision Avoidance System (ACAS), a Multilateration (MLAT) system or a Wide Area Multilateration (WAM) system. All these SSR systems transmit and receive interrogation and reply signals among the participating SSR devices. The interrogators may be any kind of appropriate SSR interrogator, such as an interrogator-aircraft 2, 3 (FIG. 1) and/or a base station 11 different from the ADS-B base station 10 (FIG. 3). The interrogation signals 21 and reply signals 22 are preferably transmitted omni-directional by the respective interrogators of the secondary surveillance source. According to a preferred embodiment of the invention shown in FIG. 1, it is suggested that the interrogation and reply signals make part of a TCAS/ACAS system.

In the case of a TCAS/ACAS system the monitored interrogation signal 21 is transmitted at 1,030 MHz and the monitored reply signal 22 is transmitted at 1,090 MHz. This is typically the frequency range in which TCAS/ACAS signals defined in ICAO DOC 9863 are transmitted. The TCAS/ACAS interrogation signals 21 typically use uplink formats UF0 (for tracking) and/or UF16 (for conflict resolution). The respective TCAS/ACAS reply signals 22 typically use the corresponding downlink formats DF0 or DF16. TCAS/ACAS interrogation signals 21 are transmitted by interrogator-aircraft to selected other target-aircraft which have found to be in a nominal range of interest, e.g. 14 nm (=25,928 km). The interrogation signals 21 are directed to the specific target-aircraft (in the example to aircraft 1) and contain its address. The interrogation signals 21 provoke the target-aircraft 1, to which the signal is directed, to respond with a reply signal 22 directed to the interrogator-aircraft 2; 3 which transmitted the interrogation signal 21. However, the interrogation and reply signals 21, 22 can be received by any appropriate receiver within reach, too. The interrogation signals 21 contain no identification information of the interrogator. The reply signal 22 contains information regarding the flight level of the target-aircraft 1 transmitting the response signal 22. For the sake of the present invention, not the content of the interrogation and/or reply signals 21, 22 is important but rather the time of arrival (TOA) of the signals 21, 22 at the receiving base station 10. In the embodiment of FIG. 1 the interrogation signal 21 is part of a TCAS/ACAS system and is transmitted by interrogator-aircraft 3 and addressed to target-aircraft 1.

In step 106 of the method according to the present invention the interrogation signal 21 is received by base station 10. To that end, the base station 10 is equipped with appropriate receiving means adapted for receiving the 1,030 MHz signal in the uplink format UF0 or UF16, respectively. In step 108 processing means of the base station 10 determine the time of arrival (TOA) of the interrogation signal 21. The base station 10 has no information regarding the origin of the interrogation signal 21, that is which interrogator transmitted the signal 21. Therefore, expectation time windows (or expected response windows, ERW) are determined in step 110 for each of the possible interrogators, that is aircraft 2 and aircraft 3, which may have transmitted the interrogation signal 21. The expectation time windows represent estimated time windows, during which a reply signal 22 form target-aircraft 1 in response to the interrogation signal 21 is expected to be received by the base station 10, based on the assumption that the position information $X_1$, $Y_1$ previously received by the base station 10 via the ADS-B signal 20 from target-aircraft 1 is correct. For calculating the expectation time windows various parameters may be considered, comprising:

the exact position $X_S$, $Y_S$ (in respect to the earth's surface) of base station 10 receiving the ADS-B signal 20 from target-aircraft 1 and the interrogation signal 21 from the interrogator of the secondary surveillance source (interrogator-aircraft 3), the position information $X_1$, $Y_1$ (in respect to the earth's surface) of target-aircraft 1 contained in the ADS-B signal 20, the position $X_2$, $Y_2$; $X_3$, $Y_3$ (in respect to the earth's surface) of the possible interrogators of the secondary surveillance source(s) (interrogator-aircraft 2 and/or interrogator-aircraft 3) possibly having transmitted the interrogation signal 21 received by the base station 10, the time of arrival (TOA) of the interrogation signal 21 at the base station 10, and the address of an aircraft (target-aircraft 1), to which the interrogation signal 21 received by the base station 10 is addressed, the address contained in the interrogation signal 21.

From the determined TOA of the interrogation signal 21 at the base station 10 it is possible to work back to an assumed time of interrogation (TOI) of the interrogation signal 21 for the one or more possible interrogators (aircraft 2 or aircraft 3) of the secondary surveillance source within the region of interest of target-aircraft 1, which previously transmitted the ADS-B signal 20. The one or more possible interrogators (interrogator-aircraft 2 or interrogator-aircraft 3), for which the assumed TOI is determined, may possibly have transmitted the interrogation signal 21, received by the base station 10. If the received interrogation signal 21 is addressed to the target-aircraft 1, which previously transmitted the ADS-B signal 20, the target-aircraft 1 is expected to send a reply signal 22 in response to the interrogation signal 21 soon. In particular, based on the assumption that all position information $X_S$, $Y_S$; $X_2$, $Y_2$; $X_3$, $Y_3$ available at the base station 10 is correct, the reply signal 22 from the target-aircraft 1, which previously transmitted the ADS-B signal 20, can be expected to be received at the base station 10 at a certain point in time or within a certain expectation time window (ERW), depending on the position of the target-aircraft 1, the position of the interrogator (interrogator-aircraft 3) of the secondary surveillance source, which transmitted the interrogation signal 21, and the TOA of the interrogation signal 21 at the base station 10.

In step 112 the base station 10 determines whether the reply signal 22 from target-aircraft 1 is received within the previously determined expectation time window (ERW). If the reply signal 22 is indeed received by the base station 10 within the previously determined expectation time window ('yes'), one can go on the assumption that the position information $X_1$, $Y_1$ of the target-aircraft 1, which transmitted the ADS-B signal 20, and possibly also the position information $X_3$, $Y_3$ of the interrogator-aircraft 3 of the secondary surveillance source, which transmitted the interrogation signal 21, are correct (step 114). As time goes on and as the method for validation according to the present invention has been performed more and more times for the same target-aircraft 1, the position information $X_1$, $Y_1$ contained in the ADS-B signal 20 received from that target-aircraft 1 is assigned an increasingly high level of confidence. As time goes on and as the method for validation according to the present invention has been performed for more and more different target-aircraft 1, 2, 3 the position information $X_1$, $Y_1$; $X_2$, $Y_2$, $X_3$, $Y_3$ contained in the ADS-B signals 20 from an increasing number of target-aircraft 1, 2, 3 within the region of interest 23 of the base station 10 is validated. In step 116 it is determined whether the method has reached the end. If so, in step 118 the method is terminated. If not, another iteration of the method, for the same or another target-aircraft i (i=1, ..., n) within the range of interest 23 of base station 10 is executed.

The following time delays or inaccuracies may be used/considered when determining the expectation time windows, which are ADS-B Mode S transponder ICAO defined delays:

128 μs (128·10⁻⁶ s) transponder reply,
0.5 μs (5·10⁻⁷ s) transponder uncertainty,
0.08 μs (8·10⁻⁸ s) transponder reply delay jitter,
7 ns (7·10⁻⁹ s) time stamp accuracy, wherein the speed of travel of the signal is 299,792,458 m/s. Of course, in practice for example the time stamp accuracy could vary from the indicated value. Furthermore, the above value for the speed of travel of the signal is indicated for vacuum. The speed of travel could vary from the indicated value, for example if there is no real vacuum between the sender and the receiver. The values for the possible transponder delays and consequently the calculation of the expectation time window(s) would have to be adapted to the actual circumstances in each single case.

Based on the determined TOA of the interrogation signal 21 at the base station 10 and considering one or more of the above mentioned time delays and inaccuracies, together with the (verified or unverified) positions $X_1$, $Y_1$; $X_2$, $Y_2$, $X_3$, $Y_3$ of the interrogators and target (aircraft 1, 2, 3) of the secondary surveillance source, the following basic formulae can be used:

$$Ait=-(Ts+Tsa),$$

wherein
Ait=Assumed Interrogation Time (from 0 seconds),
Ts=Travel time to sensor (at base station 10),
Tsa=Time stamping accuracy of the sensor.

$$ERW=Ait+Ts+Rd+Td+Tsa,$$

wherein $ERW$=Expected response window(=expectation time window),

Ait=Assumed Interrogation Time (starting from 0 seconds),
Ts=Travel time to sensor,
Td=Travel to destination target (aircraft 1),
Tsa=Time stamping accuracy of the sensor.

As mentioned above, the indicated lengths of the expectation time windows have been determined to be the minimum value corresponding to the jitter of the transponder on-board the target-aircraft 1. In a more practical approach, the lengths of the expectation time windows would be longer, approximately in the range of 1 μs (1·10⁻⁶ s) to 5 μs (5·10⁻⁶ s).

Using this information, it can be verified whether the reply signal 22 from the target-aircraft 1 in response to the interrogation signal 21 transmitted by an interrogator-aircraft, aircraft 2 or aircraft 3 (the base station 10 does not yet know, which of the two possible interrogator-aircraft 2, 3 actually transmitted the interrogation signal 21 addressed to the target-aircraft 1), is received within one of the previously defined expectation time windows. Hence, if there are a plurality of target-aircraft within the range of interest 23 of base station 10 for which the respective position information transmitted by the respective target has to be validated, a corresponding number of tables would be generated, one for each target-aircraft.

If the reply signal 22 from the target-aircraft 1 in response to the interrogation signal 21 transmitted by an interrogator-aircraft, aircraft 2 or aircraft 3, is received within one of the previously defined expectation time windows, base station 10 has information regarding which of the two possible interrogation-aircraft 2, 3 actually transmitted the interrogation signal 21 addressed to the target-aircraft 1 and further the ADS-B position information previously received from target-aircraft 1 via the ADS-B signal 20 can be regarded as being correct and can be trusted for future ATM calculations. Consequently, the level of confidence of the ADS-B position information transmitted by target-aircraft 1 via the ADS-B signal 20 can be increased. The target-aircraft's ADS-B position information has been successfully validated.

Figure 4:
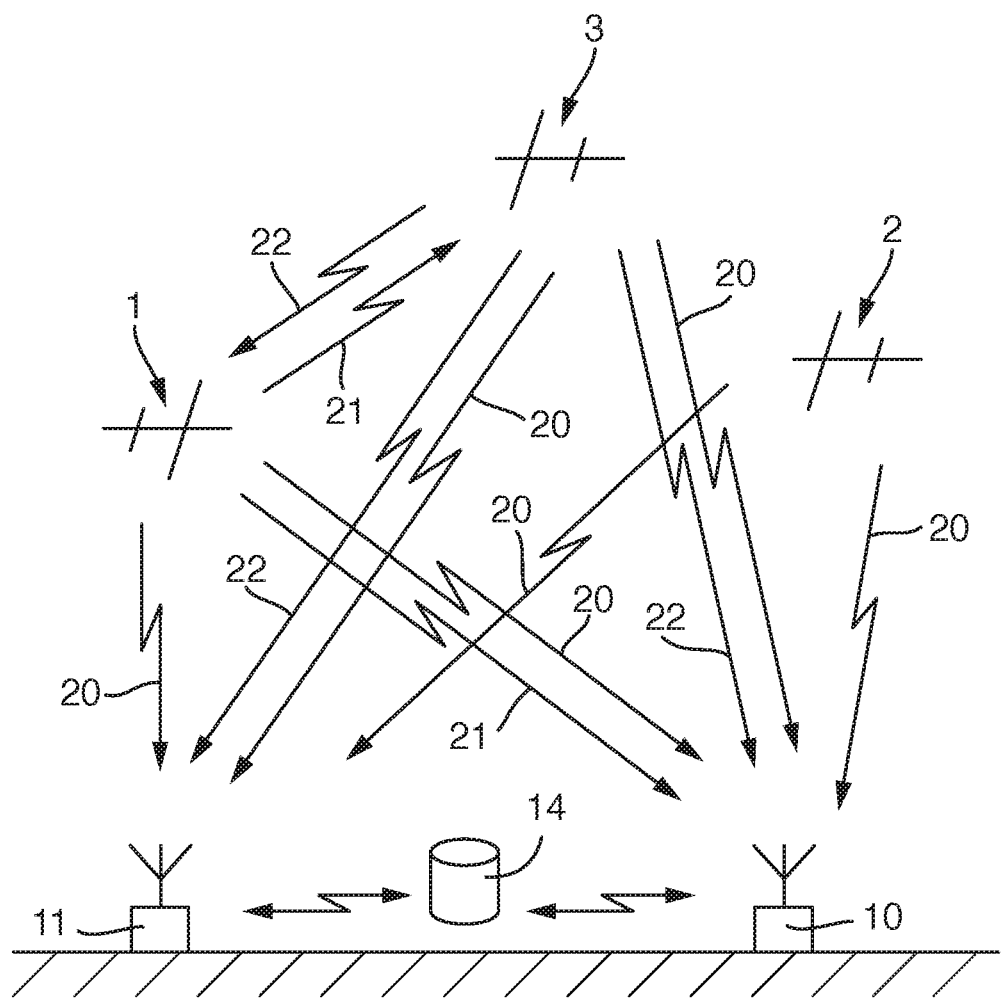
FIG. 4 a third possible scenario for realizing another preferred embodiment of the present invention, wherein the SSR interrogator is the ADS-B base station.
Figure 5:
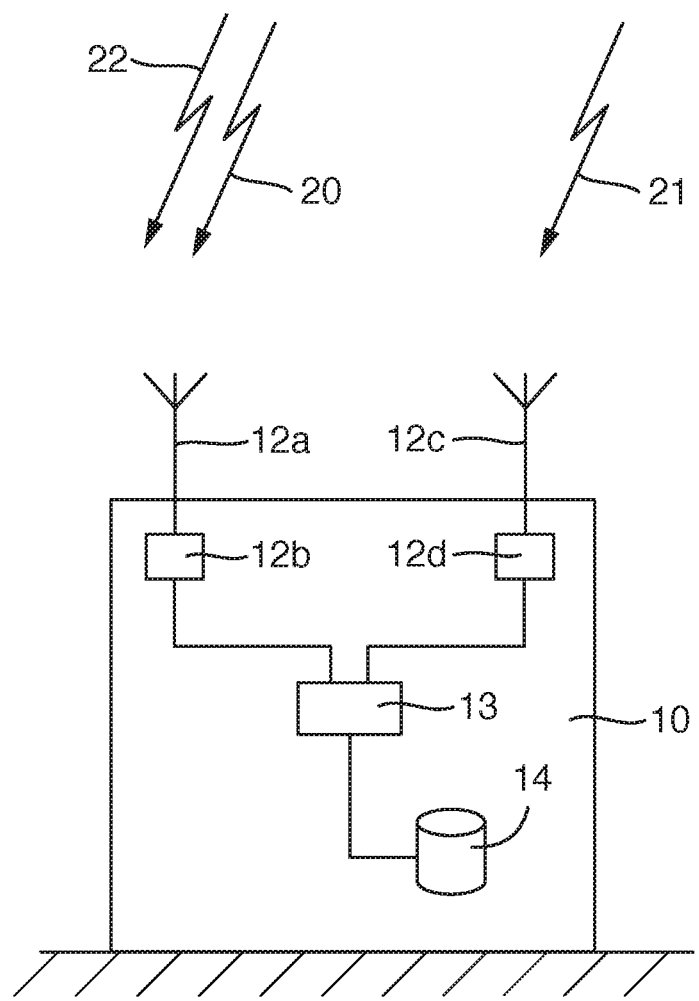
FIG. 5 a base station according to a preferred embodiment of the present invention.

The data regarding the validation of the various ADS-B position information received in the ADS-B signals 20 from the various aircraft 1, 2, 3 within the range of interest 23 of base station 10 can be entered into and updated in a credibility matrix, for example stored in a database 14 (see FIGS. 4 and 5). At the beginning of the method according to the present invention the credibility matrix can have the following content:

| Position information validated | Aircraft 1 | Aircraft 2 | Aircraft 3 |
|---|---|---|---|
| No | X | | X |
| Yes | | X | |

After the described above and considering that the target-aircraft 1 is validated based on the interrogation reply 22 being received within the ERW if interrogator-aircraft 3 is the aircraft that sent the interrogation signal 21, that was addressed for the target-aircraft 1. The embodied invention has not validated aircraft 1 position received in the ADS-B signal 20 that it transmitted and was received at ADS-B base station 10. In addition, because the ADS-B base station 10 determined the ERW for the instance where interrogator-aircraft 3 is the interrogator that sent the interrogation signal 21 with the address of the target-aircraft 1 and the position of the interrogator-aircraft 3, that was transmitted via its ADS-B signal 20, then the interrogator-aircraft 3 is validated. The following table could be updated based on this signal iteration.

| Position information validated | Aircraft (20) | Aircraft (21) | Aircraft (22) |
|---|---|---|---|
| No | X | | |
| Yes | | X | X |

If thereafter, during one of the following iterations of the method according to the present invention, the ADS-B position information received via the ADS-B signal 20 from aircraft 1 is successfully validated, the matrix could have the following content:

| Position information validated | Aircraft 1 | Aircraft 2 | Aircraft 3 |
|---|---|---|---|
| No | | | |
| Yes | X | X | X |

The content of the credibility matrix is highly dynamic. It cannot only vary regarding the validation of the ADS-B position information received from the aircraft 1, 2, 3, but it can also vary regarding the considered aircraft. For example, with time one of the aircraft, for example aircraft 2, can leave the range of interest 23 of base station 10 and new aircraft, for example aircraft 4 and 5, can enter the range of interest 23. This would result in the following content of the credibility matrix:

| Position information validated | Aircraft 1 | Aircraft 3 | Aircraft 4 | Aircraft 5 |
|---|---|---|---|---|
| No | | | X | X |
| Yes | X | X | | |

Instead of only Yes or No the confidence level of the ADS-B position information can also comprise a plurality of different levels, for example '0' (binary 00), '1' (01), '2' (10) and '3' (11). It is assumed that at the beginning of the method according to the present invention the ADS-B position information from aircraft 1 has not yet been validated at all ('0'), the position information from aircraft 2 has been successfully validated once ('1') and the position information from aircraft 3 has already been fully validated ('3'). In that case the credibility matrix would have the following content:

| Confidence level | Aircraft 1 | Aircraft 2 | Aircraft 3 |
|---|---|---|---|
| 0 | X | | |
| 1 | | X | |
| 2 | | | |
| 3 | | | X |

Each time an iteration of the method according to the present invention has been successfully executed and ADS-B position information from an aircraft successfully validated, the confidence level of the position information for that aircraft is increased by '1'. It is possible that each time an iteration of the method according to the present invention has been unsuccessfully executed and ADS-B position information from an aircraft could not be validated, the confidence level of the position information for that aircraft is decreased by '1'. It is assumed that after various iterations of the method according to the present invention the position information from aircraft 1 and aircraft 2 has been fully validated ('3'), whereas the validation of position information received from aircraft 3 has failed once ('3'-1='2'). In that case the credibility matrix would have the following content:

| Confidence level | Aircraft 1 | Aircraft 2 | Aircraft 3 |
|---|---|---|---|
| 0 | | | |
| 1 | | | |
| 2 | | | X |
| 3 | X | X | |

In the above description the present invention has been described in the context of aircraft 2, 3 as possible interrogators (interrogator-aircraft) of a secondary surveillance source transmitting the interrogation signals 21. Of course, other interrogators of different secondary surveillance sources could be used, too, for transmitting interrogation signals 21, which are received by base station 10 performing the verification and validation of the ADS-B position information received from target-aircraft 1. For example, the interrogators could be other (independent) ground based transmitter stations 11 as suggested in the embodiment of FIG. 3. In FIG. 3 the same reference signs are used for the same components of the invention as in FIG. 1. Of course, it would also be possible to use a combination of different secondary surveillance sources (e.g. TCAS/ACAS and MLAT/WAM ground stations), like another base station 11 and/or another aircraft 2 or 3, transmitting interrogation signals 21, in order to verify or validate the ADS-B position information contained in the broadcast signal 20 received from target-aircraft 1. Of course, the other independent transmitter stations (e.g. base station 11) transmitting the interrogation signals 21 could also be space based, for example mounted on one or more satellites.

FIG. 4 shows an embodiment of a scenario for realizing the present invention, in which the aircraft 3 is the target-aircraft. To this end, in this scenario the position information $X_3$, $Y_3$ of the target-aircraft 3 is validated. The aircraft 1 acts as the SSR interrogator. In particular, it is suggested that interrogator-aircraft 1 is a TCAS/ACAS enabled aircraft which transmits interrogation signals 21 addressed to the target-aircraft 3. The interrogation signals 21 are also received by base station 10. In response to the interrogator signal 21 the target-aircraft 3 transmits one or more reply signals 22, which are received by the interrogator-aircraft 1 as well as by the base station 10. The base station 10 determines the expectation time window(s) and validates the position information $X_3$, $Y_3$ of the target-aircraft 3 contained in the ADS-B signal 20. Each of the aircraft 1, 2, 3 periodically broadcasts ADS-B signals 20, which are received by the base station 10 as well as by other base stations 11. Both base stations 10, 11 have access to a common database 14, where the credibility matrix is stored.

FIG. 5 shows an embodiment of a base station 10 according to the present invention in more detail. The base station 10 comprises receiving means 12*a* comprising an antenna for receiving the ADS-B signal 20 from any capable ADS-B aircraft. Furthermore, the base station 10 comprises processing means 12*b* for pre-processing, for example decoding, the received ADS-B signal 20 and for extracting the position information $X_1$, $Y_1$ contained therein. Further, the base station 10 comprises monitoring means for detecting, receiving and decoding an interrogation signal 21 transmitted by a secondary surveillance source ('ACAS/TCAS aircraft 2, 3 or other base station 11) and for detecting and receiving, possibly also decoding, a reply signal 22 transmitted by the target-aircraft 1 in response to the interrogation signal 21. The monitoring means for receiving the ADS-B Signal 20, the interrogation signal 21 and the response signal 22 can comprise a single antenna structure. However, for simplicity in the diagram separate antennae are shown. In particular, the base station 10 further comprise an antenna 12*c* and processing means 12*d* for pre-processing, for example decoding, the received interrogation signal 21. The interrogation signal 21 may be transmitted in the 1,030 MHz frequency range. Further, the monitoring means comprise an antenna and processing means for the reply signal 22, which may be identical to the antenna 12*a* and the processing means 12*b* for the ADS-B signal 20. This is possible if both signals 20, 22 are transmitted in the 1,090 MHz frequency range. Further, the base station 10 has processing means 13 for determining the TOA of the received interrogation signal 21 and the received reply signal 22. The processing means 13 are also adapted for determining the expectation time window and for verifying whether the reply signal 22 is actually received by the base station 10 within the expectation time window. Finally, depending on the outcome of this verification, the processing means 13 increase (or decrease) the confidence level of the position information $X_1$, $Y_1$ contained in the ADS-B signal 20 and update the content of the credibility matrix stored in database 14. It is noted that the processing means 12*b*, 12*d*, 13 could be integrated a single processing apparatus comprising the processing functionalities of all processing means 12*b*, 12*d*, 13.

Summing up, there are several known types of systems for aircraft surveillance in the world. The known systems are cooperative or non-cooperative systems. A system is cooperative if the target needs any equipment so the surveillance system can work. So known primary radar is a non-cooperative technology, whereas secondary surveillance is a cooperative technology. In secondary surveillance (cooperative) the aircraft must have a transponder. Further, a system is dependent or independent. This indicates which system makes the position calculation. Primary Radar, Monopulse Secondary Service Radar (MSSR) as well as MLAT/WAM are independent technologies, i.e. the sensors/system makes the calculation. The dependent technology is thus a system where the position is determined by the target, which makes ADS-B a dependent technology.

When an operator (ANSP: Air Navigation Service Provider) looks at using any information, whether it is a primary radar return or a secondary radar return, operators typically prefer multiple services. Very few operators use only a single source. But at least with Primary Radar, MSSR or MLAT/WAM operators consider these as trustworthy sources, mainly because the operators deploy, test and maintain these sources.

One of the problems with ADS-B from an operator's point of view is its lack of "trustworthiness" because the operator does not deploy the equipment that makes the position calculation, nor does he maintain it etc. So as ADS-B is adopted, most operators will deploy other systems, like Primary Radar, MSSR or MLAT/WAM to be a second source of data to confirm the position of the ADS-B feed.

Another issue with ADS-B is the potential to spoof targets; it is rather simple to build a home based transmitter, that would send out a target or a thousand fake targets into an environment. One can easily imagine what would happen around a civilian airport if a thousand fake targets would show up. The airspace would shut down because the controllers would need to verify if the targets are real or not.

One of the concepts for ADS-B in the future is that an operator only needs ADS-B stations, no MSSRs, no WAMIMLAT even no PSRs. An ADS-B station is rather inexpensive compared to a full PSR, MSSR or even a MLAT/WAM (MLAT/WAM is comprised of several sensors typically the minimum is 5 sensors.) The present invention provides for a method to validate position information contained in the ADS-B signal with one and the same single ADS-B sensor. It represents a great cost saving to a customer and keeps the ideal concept of a single ADS-B station to cover one complete airspace. By using other sources of interrogation like described above, especially ACAS/TCAS and WAM/MLAT, the pieces of equipment can still be kept down to one "box" and at the same time still provide a validated or "trustworthy" ADS-B position information.

The invention claimed is:

1. Method for validating information regarding the position of a target-aircraft, the information contained in an ADS-B signal periodically broadcast by a target-aircraft, the method being executed in an ADS-B base station and comprising the steps of:

receiving the ADS-B signal from the target-aircraft at the base station, extracting the position information contained in the ADS-B signal, detecting, receiving and decoding an interrogation signal from a secondary surveillance source directed to the target-aircraft and detecting and receiving a reply signal transmitted by the target-aircraft in response to the interrogation signal, determining a time of arrival (TOA) of the received interrogation signal and of the received reply signal at the base station, based on the time of arrival (TOA) of the interrogation signal and on the position information, determining at least one expectation time window, in which the reply signal from the target-aircraft is expected to be received by the base station, determining whether the reply signal from the target-aircraft is received during one of the at least one expectation time window, if the reply signal from the target-aircraft is received by the base station during one of the at least one expectation time window, enhancing the confidence level of the position information contained in the ADS-B signal.

2. Method according to claim 1, wherein the received interrogation signal has been transmitted by another interrogator-aircraft.

3. Method according to claim 1, wherein the received interrogation signal has been transmitted by another base station.

4. Method according to claim 1, wherein separate expectation time windows are determined for at least one of each other base station and interrogator-aircraft within a region of interest for the base station and which could potentially have transmitted the received interrogation signal.

5. Method according to claim 1, wherein the interrogation signals and reply signals are transmitted as part of a Traffic Collision Avoidance System (TCAS) or an Aircraft Collision Avoidance System (ACAS), a Multilateration (MLAT) system or a Wide Area Multilateration (WAM) system.

6. Method according to claim 1, wherein the interrogation signal is transmitted at 1,030 MHz and the monitored reply signal is transmitted at 1,090 MHz.

7. Method according to claim 1, wherein the received interrogation signal has been transmitted by another interrogation-aircraft and wherein the at least one expectation time window, in which the reply signal from the target-aircraft is expected to be received by the base station, is determined further based on previously verified position information of the other transmitting interrogator-aircraft having an enhanced confidence level.

8. Method according to claim 1, wherein the expectation time window has a minimum length corresponding to an assumed response time of a transponder in the target-aircraft, which transmits the reply signal in response to the interrogation signal.

9. Method according to claim 8, wherein a position in time and a duration of the expectation time window are determined based on a response delay and a time sampling accuracy of the transponder.

10. Method according to claim 1, wherein the confidence levels of a plurality of aircraft within a region of interest for the base station are stored in a credibility matrix, to which the base station has access.

11. Method according to claim 10, wherein at least one other base station also executing the method according to one of the preceding claims has access to the credibility matrix, in order to update the content of the credibility matrix and to make use of the content of the credibility matrix when verifying information regarding the position of a target-aircraft (1, 2, 2), the information contained in an ADS-B signal periodically broadcast by the target aircraft.

12. Method according to claim 1, wherein information regarding the velocity of the target-aircraft is used for validating and if necessary correcting the position information extracted from the ADS-B signal or is used for estimating the position information if extraction of the position information from the ADS-B signal is not possible or has failed.

13. ADS-B base station adapted for receiving an ADS-B signal periodically broadcast by a target-aircraft and containing information regarding the position of the target-aircraft, wherein in order to validate the position information contained in the ADS-B signal, the base station comprising:

receiving means for receiving the ADS-B signal from the target-aircraft, a first processing means for extracting the position information contained in the ADS-B signal, monitoring means for detecting, receiving and decoding an interrogation signal from a secondary surveillance source directed to the target-aircraft and for detecting and receiving a reply signal transmitted by the target-aircraft in response to the interrogation signal, a second processing means adapted for determining a time of arrival (TOA) of the received interrogation signal and of the received reply signal at the base station, the second processing means further adapted for determining at least one expectation time window, in which the reply signal from the target-aircraft is expected to be received by the base station, wherein the determination of the expectation time window is based on the time of arrival (TOA) of the received interrogation signal and on the position information contained in the ADS-B signal, the second processing means further adapted for determining whether the reply signal from the target-aircraft is received during one of the at least one expectation time window, the second processing means further adapted for enhancing the confidence level of the position information contained in the ADS-B signal, if the reply signal from the target-aircraft is received by the base station during one of the at least one expectation time window.

14. ADS-B base station according to claim 13, wherein the first and second processing means are adapted to execute the method for validating information regarding the position of a target-aircraft, the information contained in an ADS-B signal periodically broadcast by a target-aircraft, the method being executed in an ADS-B base station and comprising the steps of:

receiving the ADS-B signal from the target-aircraft at the base station, extracting the position information contained in the ADS-B signal, detecting, receiving and decoding an interrogation signal from a secondary surveillance source directed to the target-aircraft and detecting and receiving a reply signal transmitted by the target-aircraft in response to the interrogation signal, determining a time of arrival (TOA) of the received interrogation signal and of the received reply signal at the base station, based on the time of arrival (TOA) of the interrogation signal and on the position information, determining at least one expectation time window, in which the reply signal from the target-aircraft is expected to be received by the base station, determining whether the reply signal from the target-aircraft is received during one of the at least one expectation time window, if the reply signal from the target-aircraft is received by the base station during one of the at least one expectation time window, enhancing the confidence level of the position information contained in the ADS-B signal wherein separate expectation time windows are determined for at least one of each other base station and interrogator-aircraft within a region of interest for the base station and which could potentially have transmitted the received interrogation signal.

15. ADS-B base station according to claim 13, wherein the base station is ground based or located on-board a satellite.

16. ADS-B base station according to claim 13, wherein the base station is in connection with at least one other base station in order to exchange credibility information regarding the confidence level of the position information ($X_1, Y_1$; $X_2, Y_2$; $X_3, Y_3$) transmitted by various aircraft in their respective ADS-B signals.

* * * * *